United States Patent
Su et al.

(10) Patent No.: US 9,813,122 B2
(45) Date of Patent: Nov. 7, 2017

(54) METHOD OF COORDINATION MULTI POINT TRANSMISSION, CONTROL NODE AND WIRELESS COMMUNICATION DEVICE

(71) Applicant: Industrial Technology Research Institute, Hsinchu (TW)

(72) Inventors: Hsuan-Jung Su, Taipei (TW); Wei-Shun Liao, New Taipei (TW); Yu-Cheng Lin, Kaohsiung (TW); Jian-Ming Liao, New Taipei (TW); Hsien-Wen Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 135 days.

(21) Appl. No.: 15/058,169

(22) Filed: Mar. 2, 2016

(65) Prior Publication Data
US 2017/0187426 A1    Jun. 29, 2017

(30) Foreign Application Priority Data
Dec. 23, 2015 (TW) .............................. 104143332 A

(51) Int. Cl.
*H04W 4/00* (2009.01)
*H04B 7/14* (2006.01)
(Continued)

(52) U.S. Cl.
CPC ........... *H04B 7/024* (2013.01); *H04B 1/3822* (2013.01); *H04B 7/0456* (2013.01)

(58) Field of Classification Search
USPC ......... 370/329–332, 334, 315, 319–325, 338
See application file for complete search history.

(56) References Cited

U.S. PATENT DOCUMENTS 8,620,210 B2 * 12/2013 Kojima ................. H04W 36/32
455/11.1
8,948,690 B2    2/2015 Duerksen
(Continued)

FOREIGN PATENT DOCUMENTS

CN    102387556    3/2012
CN    102724719    10/2012
(Continued)

OTHER PUBLICATIONS

"Office Action of Taiwan Counterpart Application", dated Dec. 14, 2016, p. 1-11.
(Continued)

*Primary Examiner* — Thai Hoang
(74) *Attorney, Agent, or Firm* — JCIPRNET

(57) ABSTRACT

A method of coordination multi-point transmission is provided, which let a plurality of base stations perform communication with at least one access point of a vehicle. A first coordination multi-point set corresponding to a first position of the vehicle is obtained by looking up a database according to the first position. The first coordination multi-point set is a set of a plurality of first coordinated base stations among the plurality of base stations. A first beamforming weighted matrix correspondingly using by each of the plurality of first coordinated base stations is obtained by looking up the database. A coordination multi-point transmission is performed with the at least one access point of the vehicle by the each of the plurality of first coordinated base stations using the corresponding first beamforming weighted matrix of the each of the plurality of first coordinated base stations.

32 Claims, 12 Drawing Sheets

(51) Int. Cl.
*H04W 36/00* (2009.01)
*H04B 7/024* (2017.01)
*H04B 1/3822* (2015.01)
*H04B 7/0456* (2017.01)

(56) References Cited

U.S. PATENT DOCUMENTS

| | | | | |
|---|---|---|---|---|
| 9,554,320 | B2* | 1/2017 | Yamamoto | B61L 27/0005 |
| 2001/0005677 | A1* | 6/2001 | Dempo | H04W 36/0055 |
| | | | | 455/436 |
| 2009/0104911 | A1* | 4/2009 | Watanabe | H04W 36/30 |
| | | | | 455/436 |
| 2011/0026421 | A1* | 2/2011 | Luo | H04B 7/024 |
| | | | | 370/252 |
| 2011/0026473 | A1* | 2/2011 | Luo | H04L 5/0035 |
| | | | | 370/329 |
| 2011/0038276 | A1* | 2/2011 | Ninagawa | H04B 7/155 |
| | | | | 370/252 |
| 2012/0172045 | A1* | 7/2012 | Fukuta | H04W 36/32 |
| | | | | 455/440 |
| 2012/0322449 | A1* | 12/2012 | Shimizu | H04W 36/24 |
| | | | | 455/436 |
| 2013/0017776 | A1* | 1/2013 | Takano | H04B 7/155 |
| | | | | 455/7 |
| 2013/0114536 | A1* | 5/2013 | Yoon | H04L 25/0226 |
| | | | | 370/329 |
| 2013/0142136 | A1* | 6/2013 | Pi | H04W 28/0289 |
| | | | | 370/329 |
| 2013/0195005 | A1* | 8/2013 | Al-Shalash | H04W 36/16 |
| | | | | 370/315 |
| 2013/0201937 | A1 | 8/2013 | Sun et al. | |
| 2013/0288687 | A1* | 10/2013 | Morioka | H04W 36/08 |
| | | | | 455/437 |
| 2017/0187426 | A1* | 6/2017 | Su | H04B 1/3822 |
| 2017/0223592 | A1* | 8/2017 | Karlsson | H04W 36/14 |

FOREIGN PATENT DOCUMENTS

| | | | |
|---|---|---|---|
| CN | 103024841 | 4/2013 | |
| EP | 2317793 | 5/2011 | |
| EP | 2538603 | 12/2012 | |
| TW | I432052 | 3/2014 | |
| WO | 2013189400 | 12/2013 | |
| WO | 2015059494 | 4/2015 | |
| WO | WO 2015059494 A1 * | 4/2015 | ............ H04W 4/001 |

OTHER PUBLICATIONS

Xia et al., "Coordinated of multi-point and bi-casting joint soft handover scheme for high-speed rail," IET Communications, Sep. 25, 2014, pp. 2509-2515.

Botella et al., "On the Performance of Joint Processing Schemes over the Cluster Area," IEEE 71st Vehicular Technology Conference, May 16-19, 2010, pp. 1-5.

Luo et al., "A CoMP soft handover scheme for LTE systems in high speed railway," EURASIP Journal Wireless Oommunications and Networking, Jun. 13, 2012, pp. 1-9.

Al et al., "Challenges Toward Wireless Communications for High-Speed Railway,"IEEE Transactions on Intelligent Transportation Systems, Oct. 5, 2014, pp. 2143-2158.

Singh et al., "Coordinated Multipoint (CoMP) Reception and Transmission for LTE-Advanced/4G," Internation Journal of Computer Science and Technology, Apr.-Jun. 2012, pp. 212-217.

Zhou et al., "Handover schemes and algorithms of high-speed mobile environment: A survey," Computer Communications, Jul. 1, 2014, pp. 1-15.

* cited by examiner

METHOD OF COORDINATION MULTI POINT TRANSMISSION, CONTROL NODE AND WIRELESS COMMUNICATION DEVICE

CROSS-REFERENCE TO RELATED APPLICATION

This application claims the priority benefit of Taiwan application serial no. 104143332, filed on Dec. 23, 2015. The entirety of the above-mentioned patent application is hereby incorporated by reference herein and made a part of this specification.

TECHNICAL FIELD

The disclosure generally relates to a method of coordination multi-point transmission, control node and wireless communication device.

BACKGROUND

Railroad or highway in many countries is very popular transport facility. For example, in the high-speed railroad system, the train speed typically may reach as high as 300 km/hr, and the high-speed train is usually serving for the passenger with long-distance travel. The ease of use for communications services is very attractive to passengers in the fast-moving vehicle. As the general experiences from the passengers aboard the high-speed rail or fast-moving vehicles on the road, although the speed may greatly save the travelling time, the rapid movement also causes that the passengers have difficulty to use wireless communication services on the vehicle.

In other words, in the mobile environment, the passenger in the vehicle often encounters a poor condition for wireless communication and even the case of a communication break. The frequency shift caused by Doppler Effect is very serious when in the mobile environment, particularly to the rapid movement. The coherent time is then quite small and it causes the difficulty for channel estimation and reception of the wireless radio signal. On the other hand, since the train on the rail or other vehicle on the road moves in high speed, the handover procedure is frequently performed between the communication device on the vehicle and the base stations inevitably. This further causes high packet loss probability due to the frequently performing of the handover procedure.

SUMMARY

In an exemplary embodiment of the disclosure, disclosing a method of coordination multi-point transmission, it is suitable for performing communication between at least one access point on a vehicle and multiple base stations. The method comprises the following steps. A first coordination multi-point set corresponding to a first position of the vehicle is obtained by looking up a database according to the first position. The first coordination multi-point set is a set of multiple first coordinated base stations among the base stations. A first beamforming weighted matrix correspondingly using by each of the first coordinated base stations is obtained by looking up the database. Wherein, a coordination multi-point transmission is performed with the at least one access point of the vehicle by the each of the first coordinated base stations using the corresponding first beamforming weighted matrix of the each of the first coordinated base stations.

In an exemplary embodiment of the disclosure, disclosing a control node, it is suitable for controlling multiple base stations performing communication with at least one access point on a vehicle. The control node comprises a connection interface and a processing circuit. The connection interface is operably connected to the base stations and the processing circuit is operably coupled to the connection interface. The processing circuit is configured for executing: obtaining a first coordination multi-point set corresponding to a first position of the vehicle by looking up a database according to the first position, wherein the first coordination multi-point set is a set of multiple first coordinated base stations among the base stations; and obtaining a first beamforming weighted matrix correspondingly used by each of the first coordinated base stations by looking up the database. Wherein, a coordination multi-point transmission is performed with the at least one access point of the vehicle by each of the first coordinated base stations using the corresponding first beamforming weighted matrix of each of the first coordinated base stations.

In an exemplary embodiment of the disclosure, disclosing a wireless communication device, it is configured in a vehicle, suitable for communicating with multiple base stations. The wireless communication device comprises multiple access points and a controller. Each of the access points respectively includes at least one antenna and is connected to each other. The controller is operably connected to the access points. The controller is configured to execute: obtaining a first coordination multi-point set corresponding to a first position of the vehicle by looking up a database according to the first position and obtaining a second beamforming weighted matrix which correspondingly used by each of the access points, wherein the first coordination multi-point set is a set of multiple first coordinated base stations among the base stations; performing a coordination multi-point transmission with the first coordinated base stations by using the second beamforming weighted matrix correspondingly used by each of the access points.

To make the above features and advantages of the present invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

Figure 1A:
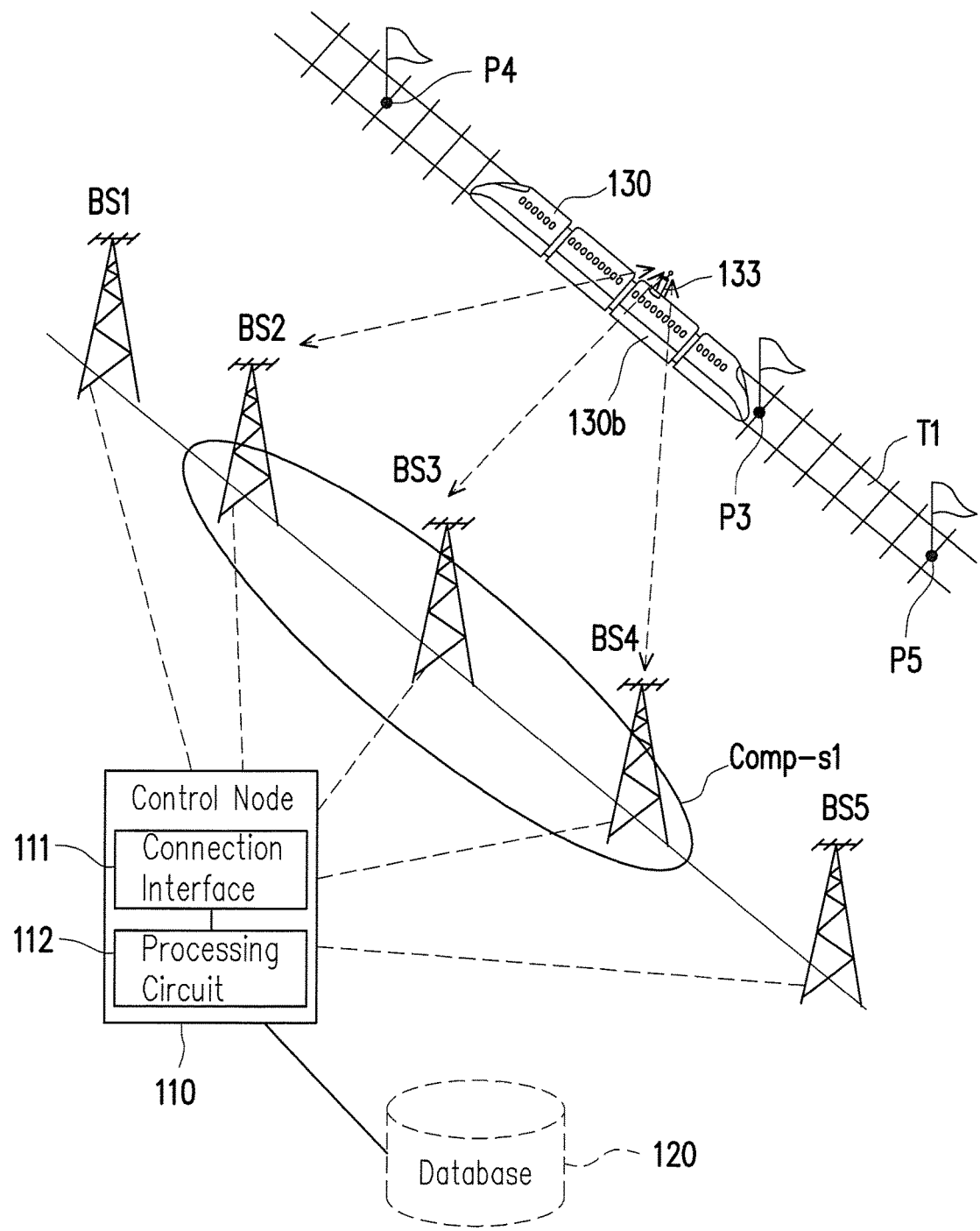
FIG. 1A is a schematic diagram illustrating application situation for a method of coordination multi-point transmission, according to an exemplary embodiment of the disclosure.

Reference will now be made with the accompanying drawings in order to provide a thorough understanding of the disclosed embodiments of the present disclosure for those skilled in the art. The inventive ideas may adopt various implementations, rather than being limited to these embodiments. Descriptions of the well-known parts are omitted in the present disclosure, and the same reference numbers are used in the present disclosure to refer to the same or like parts.

As stated in the beginning of the disclosure, the service range of a base station represents a coverage region managed by the base station. The wireless communication device located within the service range then may communicate with the base station.

In the disclosure, in a coordination multi-point (CoMP) transmission mechanism, under the situation that the service ranges of multiple base stations or relay stations are overlapping, the bases stations or the relay stations belonging to the same coordination multi-point set may transmit signals at the same time to the same wireless communication device. The wireless communication device would receive and demodulate the signals and data from the different base stations or relay stations.

In the disclosure, the term of "vehicle" represents transportation tool capable of travelling or moving along a route, such as train including high-speed train, car, or a car convoy formed from the cars, and so on, without limiting to a specific option in the disclosure. The wireless communication device is configured in the vehicle, including at least one access point and a controller, suitable for communicating with multiple base stations along the moving route. The access point of the wireless communication device may be a mobile relay, as an example.

In the disclosure, the base station (BS) may represent one in various exemplary embodiments, such as (but not for the limitation) one of Home Evolved Node B (HeNB), eNB, advanced base station (ABS), base transceiver system (BTS), home base station, relay station, and/or satellite-based communication base station. The control node may refer to the entities as follows (but not limited to): Mobility Management Entity (MME), Serving Gateway (S-GW), Packet Data Network Gateway (PDN-GW), Serving GPRS Support Node (SGSN), Gateway GPRS Support Node (GGSN), Mobile Switching Center (MSC), and Home Subscriber Server (HSS), and so on. In an exemplary embodiment of the disclosure, the control node and one of the base stations may also be the same entity.

As to hardware, the control node or base station in an example may include (but not limited to) the following components: a transceiver circuit, an analogue-to-digital converter, a digital-to-analogue converter, a processing circuit, one or more antenna units, and a storage medium in option. The transceiver circuit transmits the downlink signal and receives uplink signal by wireless manner. The transceiver circuit may include functional devices to perform operations such as low noise amplifying, resistance matching, mixing frequency, down-converting, filtering, amplifying and so on. The transceiver circuit may also include functional devices to perform operations such as amplifying, resistance matching, mixing frequency, up-converting, filtering, power amplifying and so on. The analogue-to-digital converter or digital-to-analogue converter is configured to convert the analogue signals into digital signals during the processing period for up linking signals and to convert the digital signals into analogue signals during the processing period for down linking signals.

The processing circuit is configured to process the digital signals and execute the program related to the provided method according to exemplary embodiments of the disclosure. In addition, the processing circuit of the control node or base station may be operably coupled to the memory circuit to store programming codes, a configuration of the device(s), version codebook(s), the buffering data or the permanent data. The function of processing circuit may be implemented by using the programmable unit of the microprocessing circuit, micro-controller, DSP chip, FPGA, and so on. Functions of the processing circuit may be implemented by using a programmable unit, such as a microprocessor, a microcontroller, a digital signal processing (DSP) chip, a field programmable gate array (FPGA) and the like. The functions of the processing circuit 120 may also be implemented by an independent electronic device or an integrated circuit (IC), and the processing circuit may also be implemented in form of hardware, firmware or software.

On the other hand, the access point of the wireless communication device in an example may include the following devices (but not limited to): a transceiver circuit, an analogue-to-digital converter, digital-to-analogue converter, a processing circuit, one or more antenna units, and a storage medium in option. The transceiver circuit of the access point transmits the uplink signals and receives downlink signals by wireless manner. The transceiver circuit may include functional devices to perform operation(s) such as low noise amplifying, resistance matching, mixing frequency, down-converting, filtering, amplifying and so on. The transceiver circuit may also include functional devices to perform operation(s) such as amplifying, resistance matching, mixing frequency, up-converting, filtering, power amplifying and so on. The analogue-to-digital converter or digital-to-analogue converter is configured to convert the analogue signals into digital signals during the processing period for downlink signals and to convert the digital signals into analogue signals during the processing period for uplink signals.

The controller of the wireless communication device at least includes, as in option, a storage medium and a processing circuit. The processing circuit of the controller is configured to process digital signals and execute the program related to the provided method according to exemplary embodiment of the disclosure.

In an exemplary embodiment, a method of coordination multi-point transmission is provided, suitable for allowing at least one access point on the vehicle to communicate with multiple base stations. In the method, a first coordination multi-point set corresponding to a first position of the vehicle is obtained by looking up a database according to the first position. The first coordination multi-point set is a set of multiple first coordinated base stations among the base stations. Further, multiple base stations are configured along the moving route and the first coordinated base stations in the first coordination multi-point set may be recognized according to the position of the vehicle.

A first beamforming weighted matrix correspondingly used by each of the first coordinated base stations is determined by looking up the database. In an exemplary embodiment of the disclosure, each of the first coordinated base stations respectively uses the corresponding first beamforming weighted matrix to respectively control the antenna array of each of the first coordinated base stations, so to generate and transmit a radio signal to the at least one access point of the vehicle. Thereby, the coordination multi-point transmission between the first coordinated base stations and the at least one access point on the vehicle may be performed by the first coordinated base stations utilizing the corresponding first beamforming weighted matrix. For example, when downlink communication is performed, the first coordinated base stations may use the joint transmission (JT) of the joint processing mode to transmit data to the access point on vehicle.

The foregoing database may record multiple predetermined positions of at least one route, in which these predetermined positions form the at least one route, and multiple predetermined coordination multi-point sets corresponding to the predetermined positions. In an exemplary embodiment of the disclosure, the first position used for determining the first coordination multi-point set is one of the predetermined positions in the database and the first coordination multi-point set used for recognizing the first coordinated base station is one of the predetermined coordination multi-point sets in the database. For example, the first position is used to search into a look-up table in the database, which records the predetermined positions and the predetermined coordination multi-point sets, the first coordination multi-point set corresponding to the first position may be searched out.

In an exemplary embodiment of the disclosure, when the first position is located within a range of the predetermined positions, then in an example but not for limitation, selecting any one of the predetermined positions having the range been located or selecting the predetermined position closest to the first position to correspondingly determine the first coordination multi-point set.

In an exemplary embodiment of the disclosure, the database recording the predetermined positions and the predetermined coordination multi-point sets may be built up based on the service range of each of the base stations and the at least one route having multiple predetermined positions. As an example, to a first predetermined position of the predetermined positions, if the service range of a specific base station covers the first predetermined position, the specific base station would be added into the predetermined coordination multi-point set corresponding to the first predetermined position. Thereby, the first position of the vehicle is located within the service range of each of the first coordinated base stations, each of the first coordinated base stations may perform the joint transmission at the same time with the access point near the first position.

In an exemplary embodiment of the disclosure, the database may include multiple distributed databases respectively corresponding to the base stations. One of the distributed databases corresponding to one of the first coordinated base stations records the first beamforming weighted matrix used by the one of the first coordinated base stations at the first position. In other words, the databases may be stored in the same entity device as an integrated manner or stored in different base stations as a discrete manner. The distributed database for each of the base stations records the first beamforming weighted matrix of the base station itself, thereby, the first beamforming weighted matrixes used by the base stations to perform the coordination multi-point transmission may be obtained by accessing respectively the distributed databases of the first coordinated base stations.

In an exemplary embodiment of the disclosure, when a vehicle moves from the first position to a second position, a second coordination multi-point set corresponding to the second position may be obtained by looking up the database according to the second position. The second coordination multi-point set is a set of second coordinated base stations among the base stations. Since the first position is different from the second position, the first coordination multi-point set is also different from the second coordination multi-point set. A portion of the second coordinated base stations is the same as a portion of the first coordinated base stations, that is, the service ranges of the portion of the second coordinated base stations and the service ranges of the portion of the first coordinated base stations are covering the first position and the second position.

In an exemplary embodiment of the disclosure, multiple base station identifiers of the second coordination multi-point set may be obtained by looking up the database according to the second position. The second coordinated base stations are also instructed to perform coordination multi-point transmission with the access point of the vehicle. As an example, the control node connected with the base stations may look up the database according to the second position to obtain the base station identifiers of the second coordination multi-point set and issue an instruction to each of the second coordinated base stations according to the base station identifiers been looked up. The second coordinated base stations having received the instruction may directly determine to provide the service to the access point on the vehicle and may transmit the data to the access point on the vehicle at the same time under the manner of joint transmission without executing the handover procedure.

In an exemplary embodiment of the disclosure, when the vehicle moves from the first position to the second position, a portion of the first coordinated base stations of the first coordination multi-point set is reserved and at least one of the base stations, as a newly added base station, is added to the first coordination multi-point set, so to update the first coordination multi-point set and then obtain the second coordination multi-point set. The second coordination multi-point set is the set of the second coordinated base stations among the base stations. The second coordinated base stations include the newly added base station and a portion of the first coordinated base stations.

In an exemplary embodiment of the disclosure, feedback information relating to the first position may be obtained. The feedback information is utilized to adaptively adjust the beamforming weighted matrix used by each of the coordinated base stations and the communication quality may be improved. For example, the feedback information may include an environmental parameter around the vehicle, a channel feedback information as obtained by executing coordination multi-point transmission, a current position of the vehicle as measured, or a combination of at least two thereof. However, the disclosure is not limited to these. As an example, the environmental parameter around the vehicle may be measured as the feedback information when the vehicle passes the first position. The environmental parameter may be temperature or humidity as an example. The channel feedback information as obtained by executing coordination multi-point transmission at the first coordinated base stations may be used as the feedback information relating to the first position. Further alternatively, the vehicle continuously moving may report its current position before looking up the database according to the second position. The actually current position may be utilized to adaptively adjust the beamforming weighted matrix respectively used by each of the coordinated base stations. Thereby, the first beamforming weighted matrix used by one of the first coordinated base stations is updated by use of the feedback information. The coordination multi-point transmission of the first coordinated base stations may be performed according to the first beamforming weighted matrix as updated.

In an exemplary embodiment of the disclosure, a measured beamforming weighted matrix of one of the first coordinated base stations may be estimated according to the feedback information, and the first beamforming weighted matrix used by one of the first coordinated base stations may be updated based on the measured beamforming weighted matrix. As an example, due to the relation between the environmental humidity and the signal attenuation amount, the measured beamforming weighted matrix may be estimated according to the current humidity and the first beamforming weighted matrix used by one of the first coordinated base stations may be updated based on the measured beamforming weighted matrix. In an exemplary embodiment of the disclosure, an interpolation operation between the measured beamforming weighted matrix and the first beamforming weighted matrix may be performed to obtain the updated first beamforming weighted matrix.

In an exemplary embodiment of the disclosure, when the number of access points of the vehicle is greater than 1, the access points may be treated as the transmission points in the coordination joint transmission. In other words, when the uplink communication is performed, the second beamforming weighted matrix used in each access point may be determined according to the first position of the vehicle. By using the second beamforming weighted matrix used in each access point, the coordination multi-point transmission may be performed with the first coordinated base stations. As an example, when the uplink communication is performed, each access point may be treated as the transmission point in the coordination joint transmission and transmit signal and data to the first coordinated base stations at the same time.

Multiple exemplary embodiments accompanying with drawings are used to describe the disclosure, but not for limitation.

For easy description of the disclosure, a train with multiple carriages is taken as an example for the vehicle but the disclosure is not limited to this.

FIG. 1A is a schematic diagram illustrating application situation for a method of coordination multi-point transmission, according to an exemplary embodiment of the disclosure. In this example, the train 130 moves along the route T1 and the base stations BS1-BS5 are distributed along the route T1. In other words, the train 130 would sequentially enter the service ranges of the base stations BS1-BS5. The base stations BS1-BS5 may be connected to each other by backhaul network or X2 interface for exchanging information.

The control node 110 comprises a connection interface 111 and a processing circuit 112. The connection interface 111 of the control node 110 is utilized to connect to the base stations BS1-BS5, so as to exchange information with the base stations BS1-BS5. The processing circuit 112 is coupled to the connection interface 111 operably and may instruct the base stations BS1-BS5 to execute the corresponding operation based on the information recorded in the database 120. The database 120 may be stored in the control node 110 or stored in another physical device, which is connecting to the control node 110. Also and, the disclosure does not limit the device for the storing of the database 120. In an exemplary embodiment, the base stations BS1-BS5 may use the backhaul network or the X2 interface to access data in the database 120.

In an exemplary embodiment as shown in FIG. 1A, the access point (AP) 133 is configured on the car 130b of the train 130 and may communicate with the base stations BS1-BS5. As an example, the access point 133 may serve as the relay point between the base stations BS1-BS5 and the mobile device of the passenger, such as cellular phone, tablet computer, notebook computer, or any other like, so to provide the network accessing function through network for the passenger in the train 130.

As obviously known, the geometrical locations for the route T1 and the base stations BS1-BS5 are fixed. Therefore, when the train travels to one of multiple predetermined positions of the route T1, it is predictable to know which of the base stations may provide a good quality of signal transmission. In other words, the database 120 may be built up based on a service range of the base stations BS1-BS5 and the route T1. The database 120 records multiple predetermined positions P3-P5 of the route T1 and multiple predetermined coordination multi-point (CoMP) sets. These predetermined coordination multi-point sets are sets of the coordinated base stations among the base stations. However, three predetermined positions are taken in the example for description but the disclosure is not limited to this. In other words, to the information recorded in the database 120, each predetermined position P3-P5 is corresponding to one of the predetermined coordination multi-point sets. As an example, the predetermined position P3 would corresponds to the predetermined coordination multi-point set Comp-s1.

In detail, when the train 130 travels to the position P3, the control node 110 may look up the database 120 according to the position P3 to obtain the coordination multi-point set Comp-s1. The coordination multi-point set Comp-s1 is a set of the three coordinated base stations BS2-BS4 among the base stations BS1-BS5. The position P3 locates within the service ranges of the first coordinated base stations BS2-BS4. In other words, when the train travels to the position P3, the coordinated base stations BS2-BS4 may perform the coordination multi-point transmission with the access point 133 based on the database 120. For example, the base stations BS2-BS4 perform the joint transmission of the coordination multi-point transmission with the access point 133. Thereby, in the process for the train 130 travelling along the route T1, the base stations BS1-BS5 without executing the handover procedure may directly determine whether or not to provide the network accessing service to the access point 133 of the train 130, based on the information recorded in the database 120.

Generally, the travelling information of the train 130 has already been planned. As an example, the time table for the train 130 to stop at multiple train stations may be known beforehand, so the actual geometrical location of the train 130 may be predicted according to the current time point. Further, as in an exemplary embodiment, the train 130 may be implemented with position sensor or positioning device, to detect the actual geometrical location of the train 130 and the train speed. Thereby, as in an exemplary embodiment, the control node 110 may obtain the location of the train 130 by looking up the time table in the database 120, or the train 130 may report the position information of itself to the control node 110 through the access point 133. In an exemplary embodiment, the control node 110 may look up the database 120 periodically according to the position of the train 130 in every predetermined interval, so the coordination multi-point transmission sets corresponding to different positions may be periodically obtained in accordance with the movement of the train 130. As an example, the coordination multi-point transmission set obtained by the control node 110 through looking up the database 120 according to the position P5 would be different from the coordination multi-point set Comp-s1. During the process for downlink communication, the access point 133 may receive the data transmitted from the coordinated base stations BS2-BS4 through the coordination multi-point transmission. During the process for uplink communication, the access point 133 may transmit data and signal to at least one of the coordinated base stations BS2-BS4.

Figure 1B:
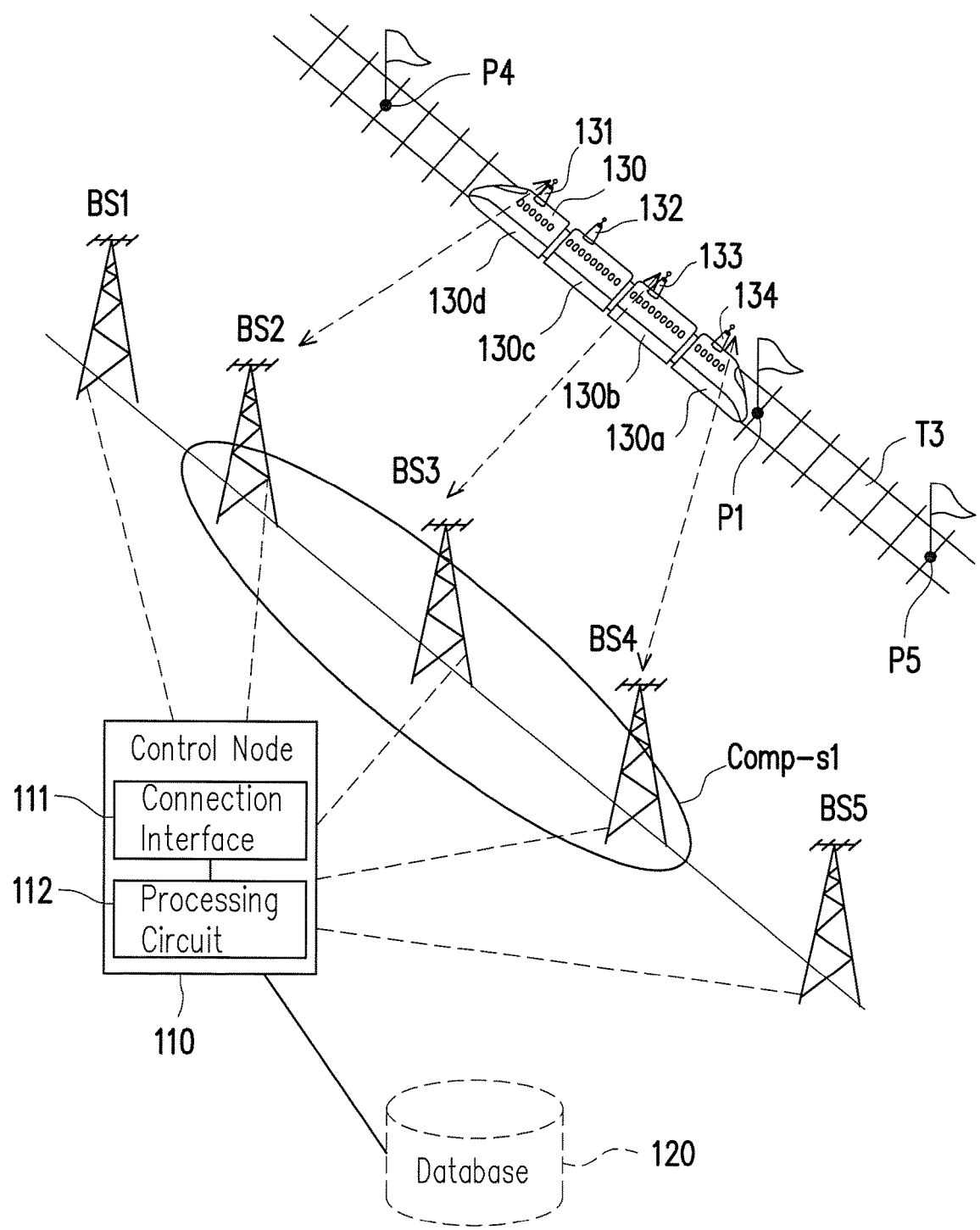
FIG. 1B is a schematic diagram illustrating application situation for a method of coordination multi-point transmission, according to an exemplary embodiment of the disclosure.

FIG. 1B is a schematic diagram illustrating application situation for a method of coordination multi-point transmission, according to an exemplary embodiment of the disclosure. Likewise, in the example, the train 130 is travelling on the route T1. The base stations BS1-BS5 are distributed along the route T1. In other words, the train 130 would sequentially enter service ranges of the base stations BS1-BS5. The base stations BS1-BS5 may be connected to each other by backhaul network or X2 interface for exchanging information.

In the example, the access point 131-134 may be respectively implemented on the cars 130a, 130b, 130c and 130d in the train 130. As an example, the access point 131 may be accessed by the mobile apparatus of the passengers, such as cellular phone, tablet computer, notebook computer, or other like apparatus, in the car 130d. The access point 132 may be accessed by the mobile apparatus of the passengers in the car 130c. The access points 133-134 are also accessed in like manner. The access points 131-133 may serve as the relay points between the mobile apparatus of the passengers and the base stations BS1-BS5, to provide the communication function about network accessing for the passengers in the train 130. During the process for downlink communication, the access points 133-134 may receive the data transmitted from the coordinated base stations BS2-BS4 through the coordination multi-point transmission.

In an exemplary embodiment, the coordinated base stations BS2-BS4 and the access points 133-134 may further generate a beam signal with a specific direction according to the beamforming technology. Thereby, during the process for downlink communication, the access points 133-134 may respectively receive the data at the same time, transmitted from different coordinated base stations BS2-BS4. As an example, the data transmitted from the coordinated base station BS2 through the coordination multi-point transmission may be received by the access point 131. The data transmitted from the coordinated base station BS3 through the coordination multi-point transmission may be received by the access point 133. The data transmitted from the coordinated base station BS4 through the coordination multi-point transmission may be received by the access point 134.

Figure 2:
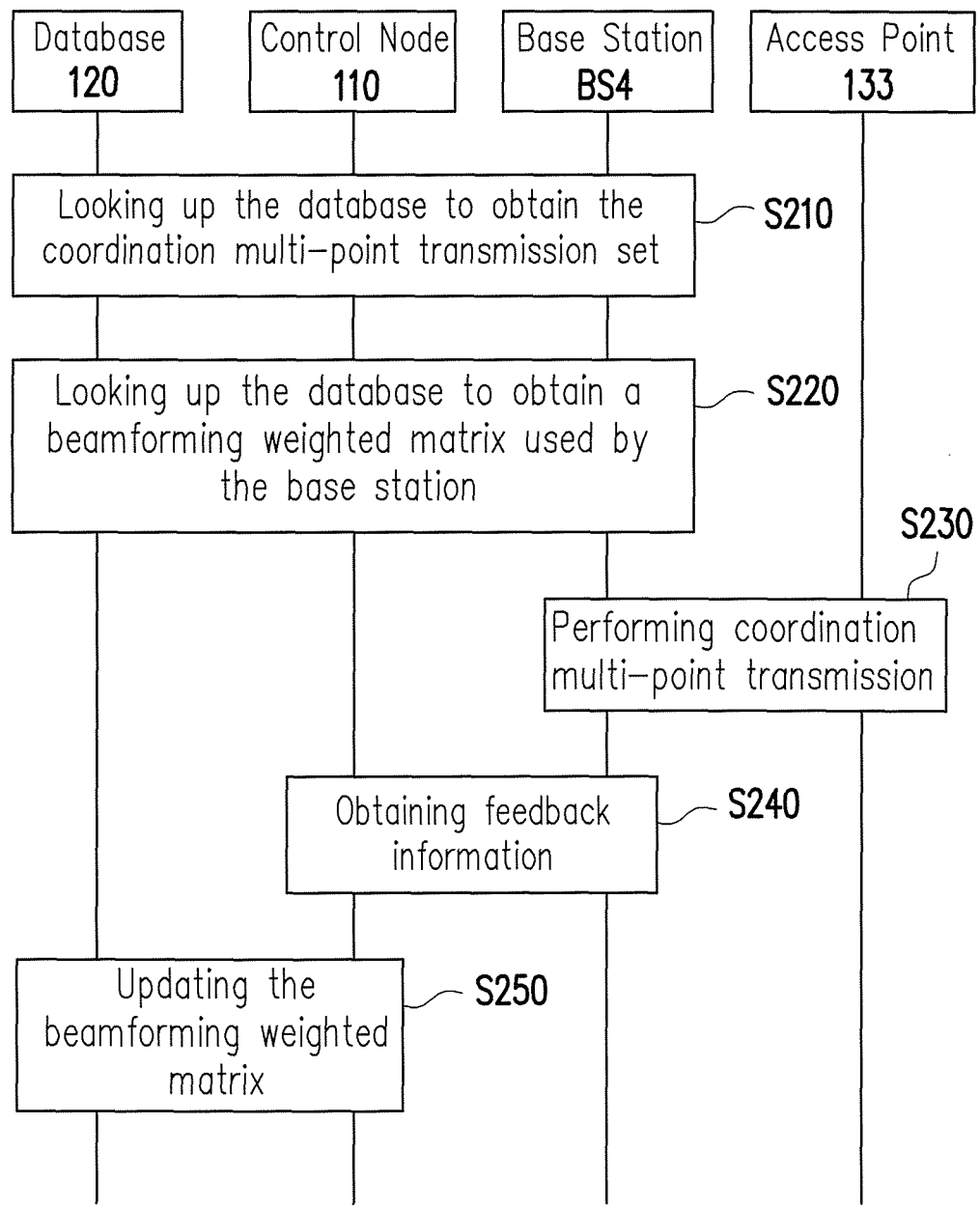
FIG. 2 is a flowchart illustrating a method of coordination multi-point transmission, according to an exemplary embodiment of the disclosure.

FIG. 2 is a flowchart illustrating a method of coordination multi-point transmission, according to an exemplary embodiment of the disclosure. The exemplary embodiment shown in FIG. 2 is suitable for the application situation in FIG. 1A or FIG. 1B. Referring to FIG. 1A, FIG. 1B and FIG. 2, in step S210, the control node 10 looks up the database 120 according to the position P3 of the vehicle at the first time point and obtains the coordination multi-point set Comp-s1. The control node 110 may look up the database 120 and recognize the coordinated base stations BS2-BS4, and allocate the data to be transmitted to the access point 133 to the coordinated base stations BS4. In step S220, the control node 110 looks up the database 120 to obtain a beamforming weighted matrix used by the coordinated base station BS4. In the example that the coordinated base station BS4 may not directly access the database 120, the control node 110 may transmit the beamforming weighted matrix as looking up to the coordinated base station BS4. In the exemplary embodiment that the base station BS4 may directly access the database 120, the control node 110 may control the base station BS4 to access the database 120 by itself and obtain the beamforming weighted matrix.

Furthermore, the coordinated base station BS4 may include antenna array, multiple multi-phase converters, and multiple power amplifiers, to complete the performance of the beamforming function. The relative phases for the signals to be transmitted to each antenna of the antenna array have been properly adjusted, and the strength of the signals at the specific direction is magnified at the end and then the strength at the other direction is suppressed. Here, each element in the beamforming weighted matrix is corresponding to a different antenna in the antenna array, so to determine the relative phase and strength of the signal to be transmitted to each antenna of the antenna array. Thus, the coordinated base station BS4 may generate the beam with the specific direction according to the beamforming weighted matrix, to communicate with the access point of the moving vehicle.

In step S230, the coordination multi-point transmission is performed between the base station BS4 and the access point 133. In step S240, by measuring the channel, measuring the environmental parameters, or detecting the position of vehicle, the coordinated base station BS4 may obtain feedback information relating to the position P3, and transmit the feedback information to the control node 110. In step S250, the control node 110 uses the feedback information to update the beamforming weighted matrix of the coordinated base station BS4.

Figure 3A:
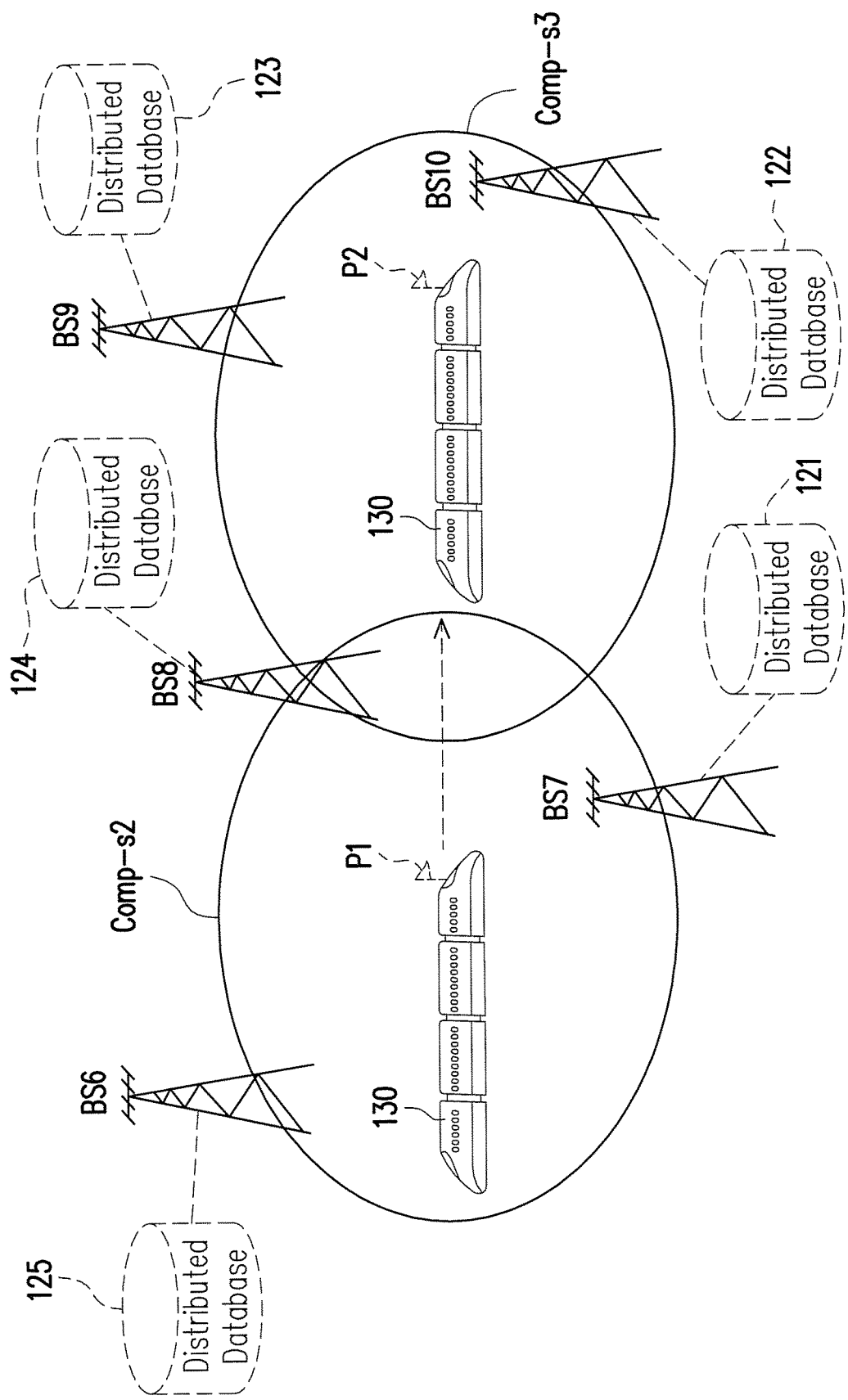
FIG. 3A is a schematic diagram illustrating a method of coordination multi-point transmission, according to an exemplary embodiment of the disclosure.

FIG. 3A is a schematic diagram illustrating a method of coordination multi-point transmission, according to an exemplary embodiment of the disclosure. Referring to FIG. 3A, the train 130 is travelling along a route and moves from the position P1 to the position P2. When the train 130 travels to the position P1, the coordination multi-point transmission set Comp-s2 may be obtained by looking up the database, and the control node may recognize the coordinated base stations BS6-BS8, based on the coordination multi-point transmission set Comp-s2. Thus, the control node may allocate the data and control signal, which are to be transmitted to the communication apparatus on the vehicle, to the coordinated base stations BS6-BS8, so the coordinated base stations BS6-BS8 may transmit the data and control signal at the same time to the communication apparatus on the vehicle.

In the exemplary embodiment of FIG. 3A, the database may further be set up by a discrete manner, including multiple distributed databases respectively correspond to the coordinated base stations BS6-BS8. In addition, each discrete database may individually record the beamforming weighted matrix used by the corresponding base station. The beamforming weighted matrices are respectively corresponding to the different train positions. In detail, the distributed database 121 may be stored in the storage medium of the base station BS7. The distributed database 121 may record the beamforming weighted matrix used by the base station BS7. The beamforming weighted matrices used by the base station BS7 are respectively corresponding to the different train positions. The other distributed databases 122-125 are like the distributed database 121. As an example, the distributed database 125 corresponding to the base station BS6 records the beamforming weighted matrix used in the base station BS6 at position P1.

When the coordinated base stations BS6-BS8 receive the to-be-transmitted data from the control node, the coordinated base stations BS6-BS8 may respectively obtain the beamforming weighted matrix with respect to the position P1 by respectively looking up the distributed databases 121, 124, and 125. And then, each of the coordinated base stations BS6-BS8 may individually use the beamforming weighted matrix and perform the coordination multi-point transmission with the access point on the train 130.

When the train 130 moves from the position P1 to the position P2, the control node may obtain the coordination multi-point transmission set Comp-s3 by directly looking up the database according to the position P2. Alternatively, the control node may obtain the coordination multi-point transmission set Comp-s3 by updating the coordination multi-point transmission set Comp-s2. The coordination multi-point transmission set Comp-s3 is a set of coordinated base stations BS8-BS10.

As an example, when the train 130 moves from the position P1 to the position P2, the control node may look up the database according to the position P2, and obtain the coordination multi-point set Comp-s3 corresponding to the position P2. The coordination multi-point set Comp-s2 is different from the coordination multi-point set Comp-s3 and the base station BS8 in the coordination multi-point set Comp-s3 is the same as the base station BS8 in the coordination multi-point set Comp-s2.

In addition, when the train 130 moves from the position P1 to the position P2, the control node may reserve a portion of coordinated base stations in the coordination multi-point set Comp-s2 and add at least one newly-added base station to the coordination multi-point set Comp-s2, to update the coordination multi-point set Comp-s2 and obtain the coordination multi-point set Comp-s3. The coordinated base stations of the coordination multi-point set Comp-s3 includes the newly-added base station and the portion of the coordination multi-point set Comp-s2. Taking the example in FIG. 3A, the control node reserves the coordinated base station BS8 in the coordination multi-point set Comp-s2 and adds two base stations BS9-BS10 to the coordination multi-point set Comp-s2, so to update the coordination multi-point set Comp-s2 and then obtain the coordination multi-point set Comp-s3.

Likewise, the coordinated base stations BS8-BS10 may look up the distributed databases 122-124 and respectively obtain the beamforming weighted matrix to control the antenna array. Thereby, under the scenario that the access point on the train 130 does not execute the handover procedure, the access point on the train 130 switches from communicating with the coordinated base stations BS6-BS8 to communicating with the coordinated base stations BS8-BS10.

Figure 3B:
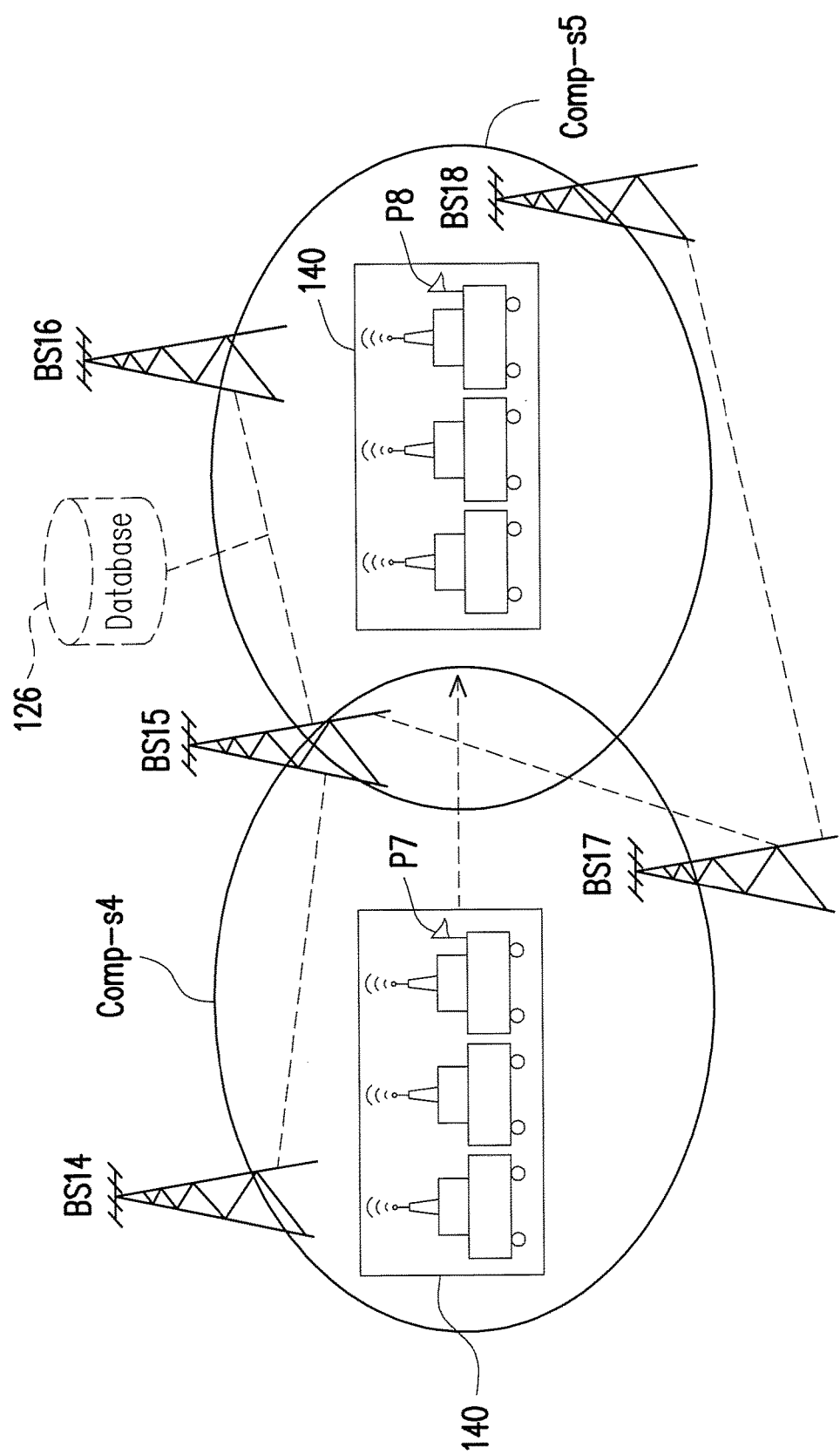
FIG. 3B is a schematic diagram illustrating a method of coordination multi-point transmission, according to an exemplary embodiment of the disclosure.

Taking an example that multiple cars form a car convoy for description, FIG. 3B is a schematic diagram illustrating a method of coordination multi-point transmission, according to an exemplary embodiment of the disclosure. Referring to FIG. 3B, the car convoy 140 includes multiple cars, in which three cars in FIG. 3B are taken as the example but not for the limitation in disclosure. The car convoy 140 travels on a route and moves from the position P7 to the position P8. When the car convoy 140 travels to the position P7, the coordination multi-point transmission set Comp-s4 may be obtained by looking up the database 126, and the control node may recognize the coordinated base stations BS14, BS15, and BS17, based on the coordination multi-point transmission set Comp-s4. Then, the control node may allocate the data and control signal, which are to be transmitted to the communication apparatus on the car convoy 140, to the coordinated base stations BS14, BS15, and BS17. The coordinated base stations BS14, BS15, and BS17 may transmit the data and control signal at the same time to the communication apparatus on the vehicle (car convoy 140).

In the exemplary embodiment, the base stations BS14-BS18 are connected by the backhaul network or X2 interface. Thus, all of the base stations BS14-BS18 have the capability to access the database 126. Thereby, when the coordinated base stations BS14, BS15, and BS17 receive the to-be-transmitted data from the control node, the coordinated base stations BS14, BS15, and BS17 may respectively obtain the beamforming weighted matrix corresponding to the position P7 by looking up the database 126. Then, the coordinated base stations BS14, BS15, and BS17 may uses the individual beamforming weighted matrix to perform the coordination multi-point transmission with the access point of the car convoy 140.

When the car convoy 140 travels from the position P7 to the position P8, the control node may directly look up the database 126 according to the position P8 and obtain the coordination multi-point transmission set Comp-s5. Alternatively, the control node may obtain the coordination multi-point transmission set Comp-s5 by updating the coordination multi-point transmission set Comp-s4. The coordination multi-point transmission set Comp-s5 is a set of the coordinated base stations BS15, BS16 and BS18. Under the scenario that each car in the car convoy 140 does not execute a handover procedure, each car in the car convoy 140 switches from a communication with the coordinated base stations BS14, BS15, and BS17 to a communication with the coordinated base stations BS15, BS16, and BS18.

Figure 4A:
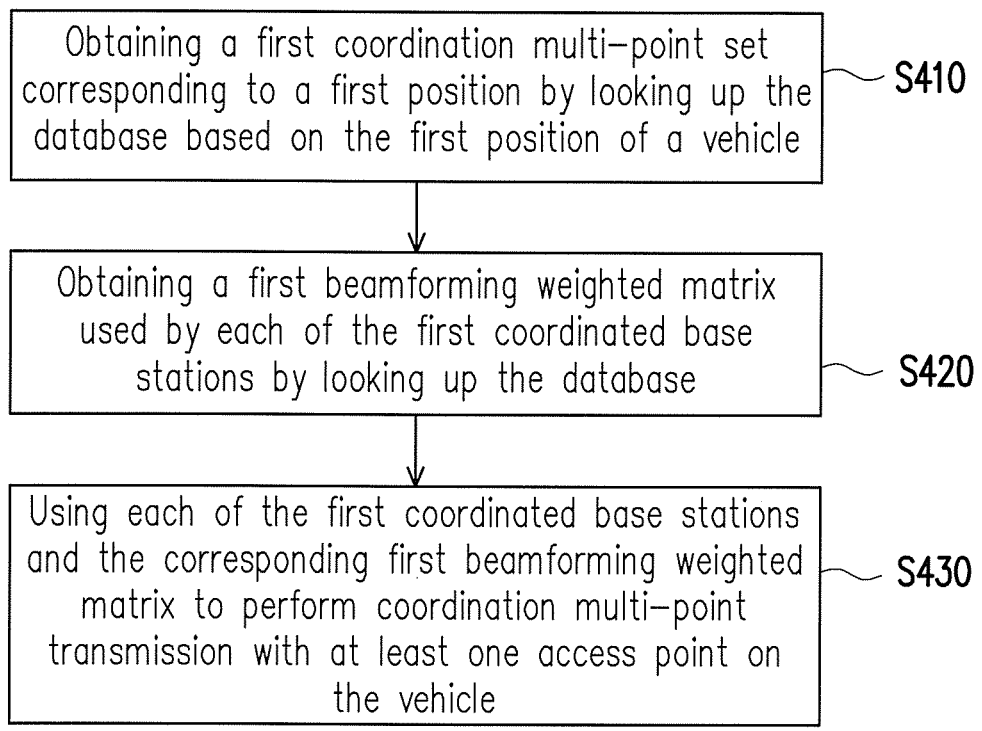
FIG. 4A is a flowchart illustrating a method of coordination multi-point transmission, according to an exemplary embodiment of the disclosure.

FIG. 4A is a flowchart illustrating a method of coordination multi-point transmission, according to an exemplary embodiment of the disclosure. Referring to FIG. 4A, in step S410, a first coordination multi-point set corresponding to a first position is obtained by looking up the database based on the first position of the vehicle. In step S420, a first beamforming weighted matrix used by each of the first coordinated base stations is obtained by looking up the database.

In step S430, each of the first coordinated base stations and the corresponding first beamforming weighted matrix are utilized to perform coordination multi-point transmission with at least one access point on the vehicle. The steps S410-S420 as shown in FIG. 4A may be performed by the processing circuit 112 of the control node 110 as shown in FIG. 1A but the disclosure is not just limited to this.

Figure 4B:
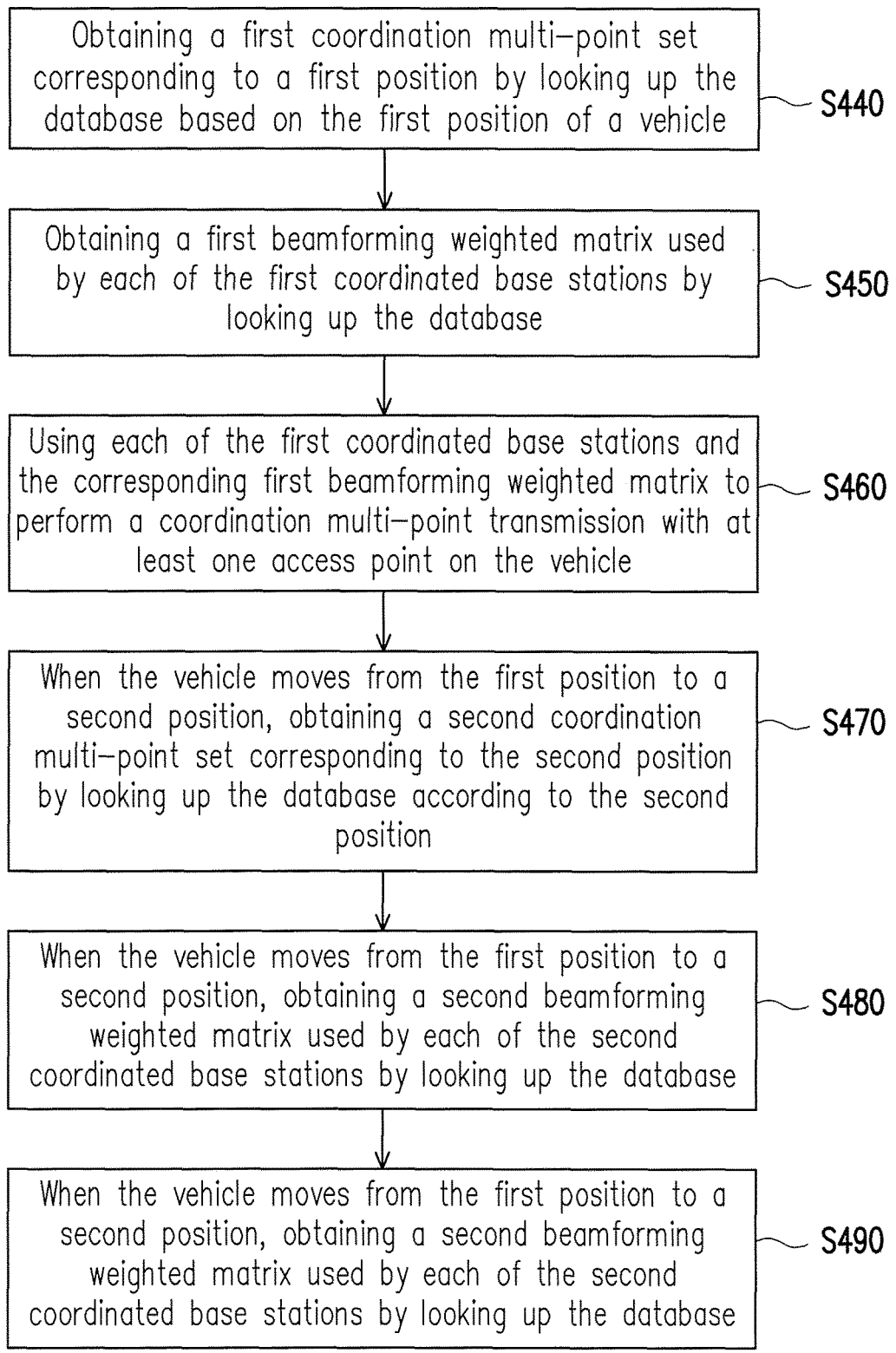
FIG. 4B is a flowchart illustrating a method of coordination multi-point transmission, according to an exemplary embodiment of the disclosure.

Now providing a control flow as an example to describe how the new coordination multi-point transmission set is obtained by looking up the database according to the new position. FIG. 4B is a flowchart illustrating a method of coordination multi-point transmission, according to an exemplary embodiment of the disclosure. Referring to FIG. 4B, in step S440, a first coordination multi-point set corresponding to a first position is obtained by looking up the database based on the first position of the vehicle. In step S450, a first beamforming weighted matrix used by each of the first coordinated base stations is obtained by looking up the database. In step S460, each of the first coordinated base stations and the corresponding first beamforming weighted matrix are utilized to perform a coordination multi-point transmission with at least one access point on the vehicle. In step S470, when the vehicle moves from the first position to a second position, a second coordination multi-point set corresponding to the second position is obtained by looking up the database according to the second position. In step S480, when the vehicle moves from the first position to a second position, a second beamforming weighted matrix used by each of the second coordinated base stations is obtained by looking up the database. In step S490, each of the second coordinated base stations and the corresponding second beamforming weighted matrix are utilized to perform a coordination multi-point transmission with at least one access point on the vehicle. The steps S440-S450 and S470-S480 as shown in FIG. 4B may be performed by the processing circuit 112 of the control node 110 as shown in FIG. 1A but the disclosure is not just limited to this.

Figure 4C:
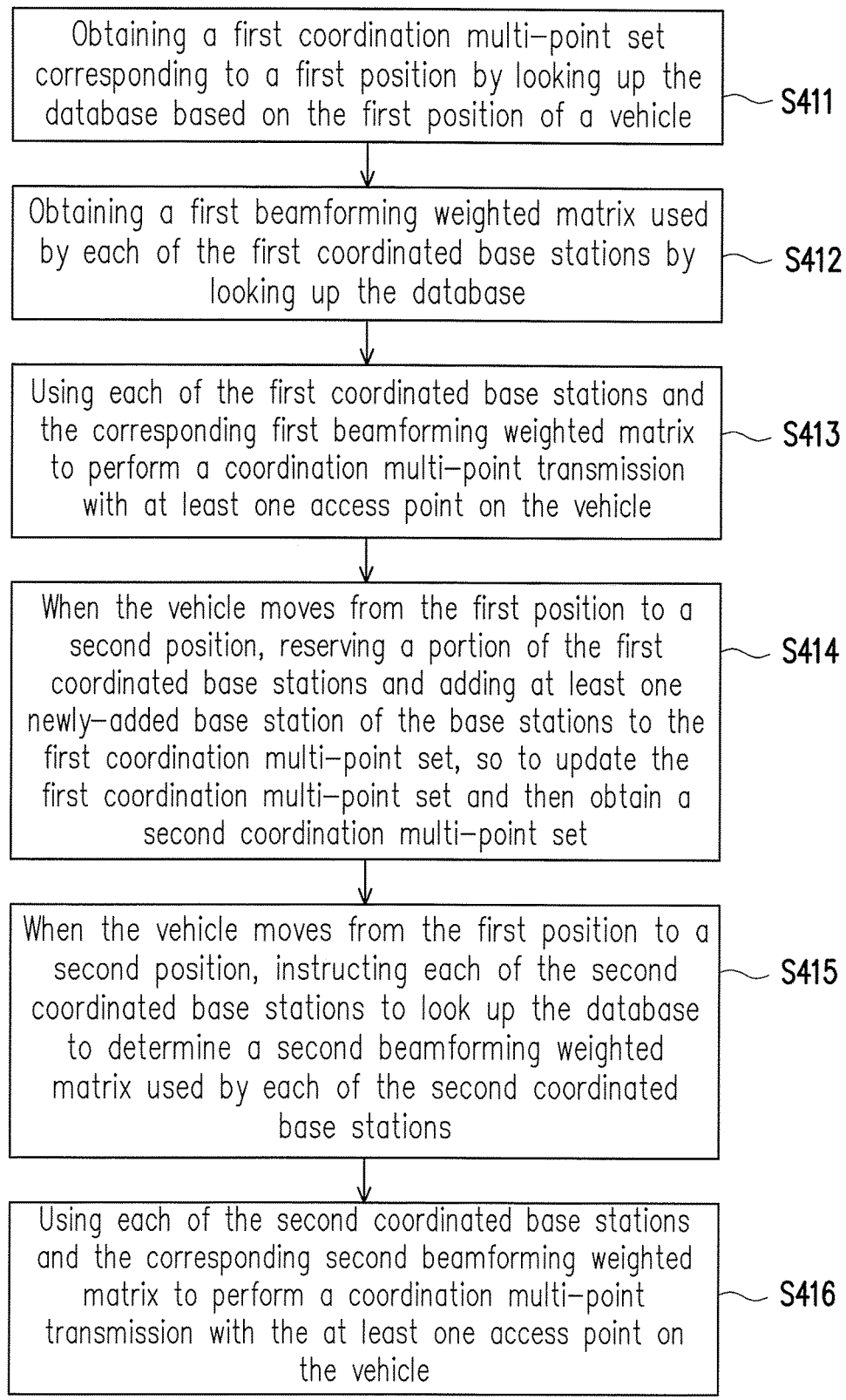
FIG. 4C is a flowchart illustrating a method of coordination multi-point transmission, according to an exemplary embodiment of the disclosure.

Further providing a control flow as an example to describe how the new coordination multi-point transmission set is obtained by updating the old coordination multi-point transmission set. FIG. 4C is a flowchart illustrating a method of coordination multi-point transmission, according to an exemplary embodiment of the disclosure. Referring to FIG. 4C, in step S411, a first coordination multi-point set corresponding to a first position is obtained by looking up the database based on the first position of the vehicle. In step S412, a first beamforming weighted matrix used by each of the first coordinated base stations is obtained by looking up the database. In step S413, each of the first coordinated base stations and the corresponding first beamforming weighted matrix are utilized to perform a coordination multi-point transmission with at least one access point on the vehicle.

In step S414, when the vehicle moves from the first position to a second position, a portion of the first coordinated base stations is reserved and at least one newly-added base station among the base stations is added to the first coordination multi-point set, so to update the first coordination multi-point set and then obtain a second coordination multi-point set. In step S415, when the vehicle moves from the first position to a second position, each of the second coordinated base stations is instructed to look up the database to determine a second beamforming weighted matrix used by each of the second coordinated base stations. In step S416, each of the second coordinated base stations and the corresponding second beamforming weighted matrix are utilized to perform a coordination multi-point transmission with at least one access point on the vehicle. The steps S411-S412 and S414-S415 as shown in FIG. 4C may be performed by the processing circuit 112 of the control node 110 as shown in FIG. 1A but the disclosure is not just limited to this.

Figure 5:
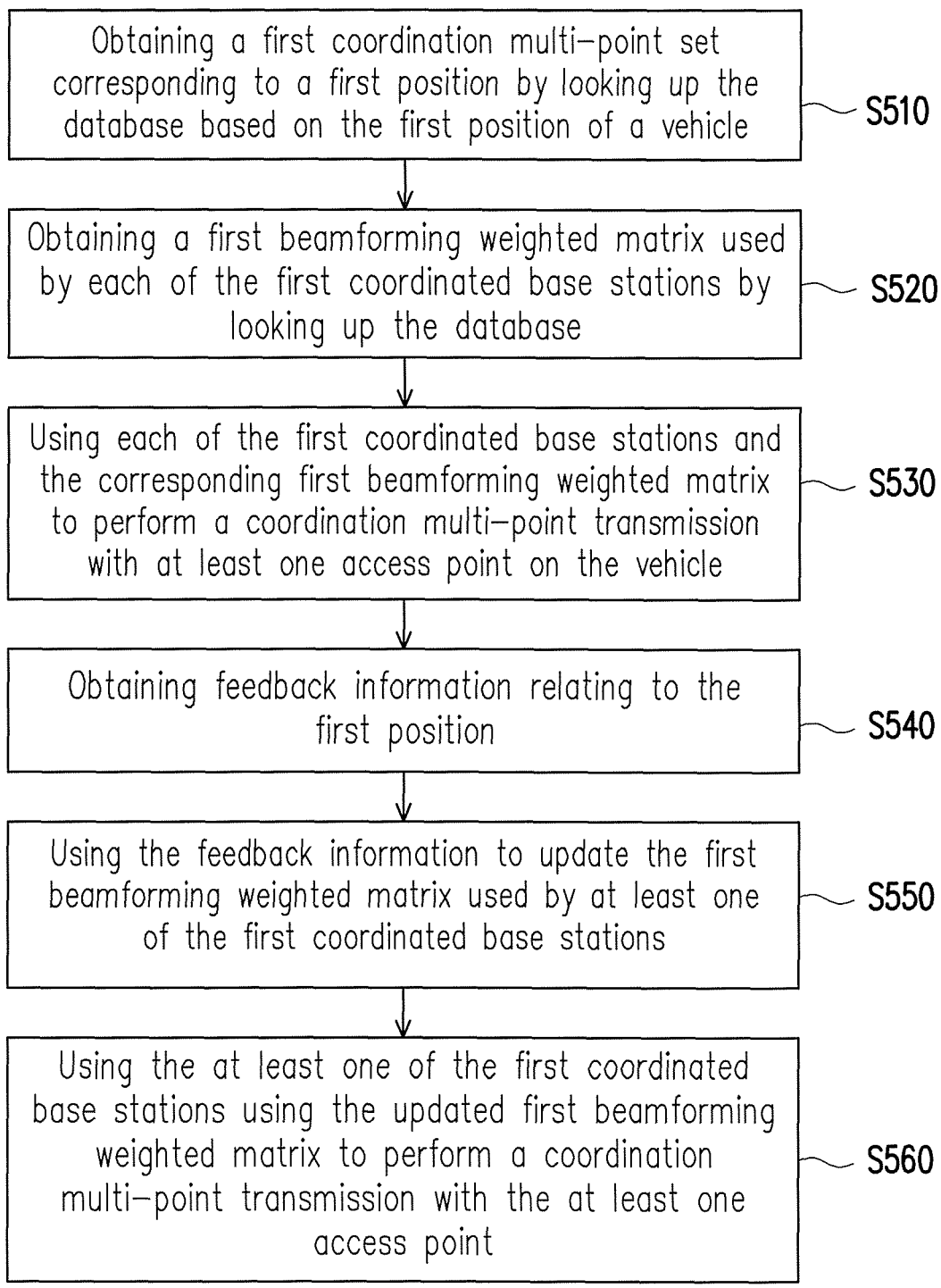
FIG. 5 is a flowchart illustrating of updating beamforming weighted matrix by using the feedback information, according to an exemplary embodiment of the disclosure.

FIG. 5 is a flowchart illustrating of updating beamforming weighted matrix by using the feedback information, according to an exemplary embodiment of the disclosure. Referring to FIG. 5, in step S510, a first coordination multi-point set corresponding to a first position is obtained by looking up the database based on the first position of the vehicle. In step S520, a first beamforming weighted matrix used by each of the first coordinated base stations is obtained by looking up the database. In step S530, each of the first coordinated base stations and the corresponding first beamforming weighted matrix are utilized to perform a coordination multi-point transmission with at least one access point on the vehicle.

In step S540, feedback information relating to the first position is obtained. The feedback information may comprise an environmental parameter around the vehicle, a channel feedback information as obtained by executing the coordination multi-point transmission, a current position of the vehicle as measured, or a combination of at least two of the foregoing three information, but the disclosure is not limited to this. As an example, the environmental parameter around the vehicle may be measured as the feedback information when the vehicle passes the first position. The environmental parameter may be temperature or humidity as an example. The channel feedback information as obtained by executing a coordination multi-point transmission at the first coordinated base stations may be served as the feedback information relating to the first position. Further alternatively, the vehicle at a state of continuously moving may report its current position before the looking up the database according to the second position. The actually current position may be utilized to adaptively adjust the beamforming weighted matrix respectively used by each of the coordinated base stations.

In step S550, the feedback information is utilized to update the first beamforming weighted matrix used by at least one of the first coordinated base stations. Further in detail, the feedback information relating to the actual environment and the current communication condition may be used to estimate a measured beamforming weighted matrix. As an example, the environmental temperature is proportional to the noise power. The measured beamforming weighted matrix may thereby be estimated based on the temperature serving as the feedback information. In an exemplary embodiment, the measured beamforming weighted matrix corresponding to different temperature condition may be built up in the database beforehand. Thus, the measured beamforming weighted matrix closest to the actual temperature as measured may be obtained by looking up the database. Further, environmental humidity is also relating to the attenuation of radio signal. Thus, the measured beamforming weighted matrix may be estimated, based on the humidity serving as the feedback information. In an exemplary embodiment, the measured beamforming weighted matrix corresponding to different humidity condition may be built up in the database beforehand. The measured beamforming weighted matrix closest to the actual humidity as measured may be thereby obtained by looking up the database. As a result, the updated first beamforming weighted matrix may be obtained by perform interpolation between the measured beamforming weighted matrix and the first beamforming weighted matrix.

As an example, the first beamforming weighted matrix is shown in matrix (1):

$$\begin{bmatrix} 0.5+0.5j & 0.25+0.75j \\ 0.75+0.25j & 0.4+0.6j \end{bmatrix} \quad \text{matrix (1)}$$

The measured beamforming weighted matrix as obtained based on the feedback information is shown in matrix (2):

$$\begin{bmatrix} 0.75+0.2.5j & 0.3+0.7j \\ 0.8+0.2j & 0.6+0.4j \end{bmatrix} \quad \text{matrix (2)}$$

The updated first beamforming weighted matrix may be obtained by performing an interpolation operation between the matrix (1) and matrix (2). The updated first beamforming weighted matrix is shown in matrix (3):

$$\begin{bmatrix} 0.625+0.375j & 0.275+0.725j \\ 0.775+0.225j & 0.5+0.5j \end{bmatrix} \quad \text{matrix (3)}$$

As a result, in step S560, at least one of the first coordinated base stations uses the updated first beamforming weighted matrix to perform a coordination multi-point transmission with at least one access point. The steps S540-S550 as shown in FIG. 5 may be performed by the processing circuit 112 of the control node 110 as shown in FIG. 1A, but the disclosure is not just limited to this. As an example, the steps S540-S550 as shown in FIG. 5 may be performed by the base station BS4 as shown in FIG. 1A, but the disclosure is not just limited to this.

Figure 6:
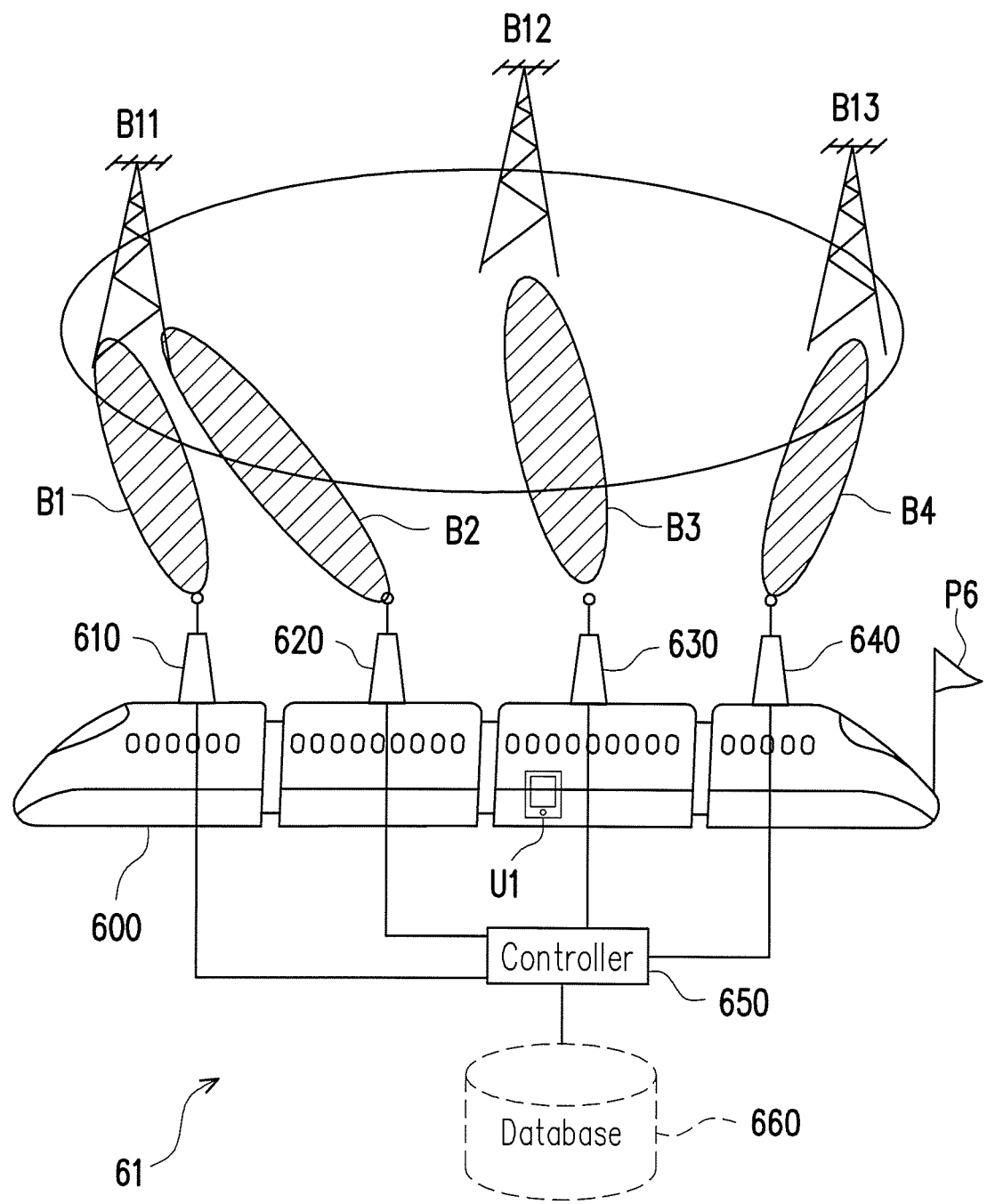
FIG. 6 is a schematic diagram illustrating that a user's equipment communicates with the coordinated base stations through the wireless communication device of the vehicle, according to an exemplary embodiment of the disclosure.

FIG. 6 is a schematic diagram illustrating that a user's equipment communicates with the coordinated base stations through the wireless communication device of vehicle, according to an exemplary embodiment of the disclosure. Referring to FIG. 6, a wireless communication device 61 is configured in a vehicle 600. The vehicle 600 travels on a route. The wireless communication device 61 includes a plurality of access points 610-640 and controller 650. Each of the access points 610-640 respectively includes at least one antenna and the access points 610-640 are connecting to each other and may be treated as multiple transmission points in the coordination multi-point transmission. The access points 610-640 may also be treated as the relay points between the user's equipment U1 and the base stations around the route.

The controller 650 may be a processor in general use, a processor in specific use, a conventional processor, a digital signal processor, multiple microprocessors, a microprocessor as a core from one or more digital signal processors in combination, a microcontroller, an Application Specific Integrated Circuit (ASIC), a Field Programmable Gate Array (FPGA), or any other integrated circuit. The controller 650 is operably connected to the access points 610-640. The controller 650 looks up the database 660 according to the position P6 of the vehicle 600 to obtain the coordination multi-point set Comp-s6 corresponding to the position P6, and then obtain the beamforming weighted matrix used by each of the access points 610-640. The coordination multi-point set Comp-s6 is a set of multiple coordinated base stations BS11-BS13. The controller 650 controls each access point 610-650 to use the corresponding second beamforming weighted matrix to perform a coordination multi-point transmission with the coordinated base stations BS11-BS13.

As shown in FIG. 6, the access point 610 may generate the beam B1 with a specific direction or field type, based on the corresponding beamforming weighted matrix. The beam B1 is also utilized to receive the downlink data transmitted from the base station BS11, or the beam B1 is utilized to transmit the uplink data configured by the controller 650. In addition, the access point 620 may generate the beam B2 with a specific direction or field type, based on the corresponding beamforming weighted matrix. The beam B2 is also used to receive the downlink data transmitted from the base station BS11, or the beam B2 is used to transmit the uplink data configured by the controller 650.

In addition, the access point 630 may generate the beam B3 with a specific direction or field type, based on the corresponding beamforming weighted matrix. The beam B3 is utilized to receive the downlink data transmitted from the base station BS12, or the beam B3 is used to transmit the uplink data configured by the controller 650. The access point 640 may generate the beam B4 with a specific direction or field type, based on the corresponding beamforming weighted matrix. The beam B4 is utilized to receive the downlink data transmitted from the base station BS13, or the beam B4 is used to transmit the uplink data configured by the controller 650. In other words, the user's equipment may communicate with the coordinated base stations BS11-BS13 through the beams B1-B4.

Figure 7:
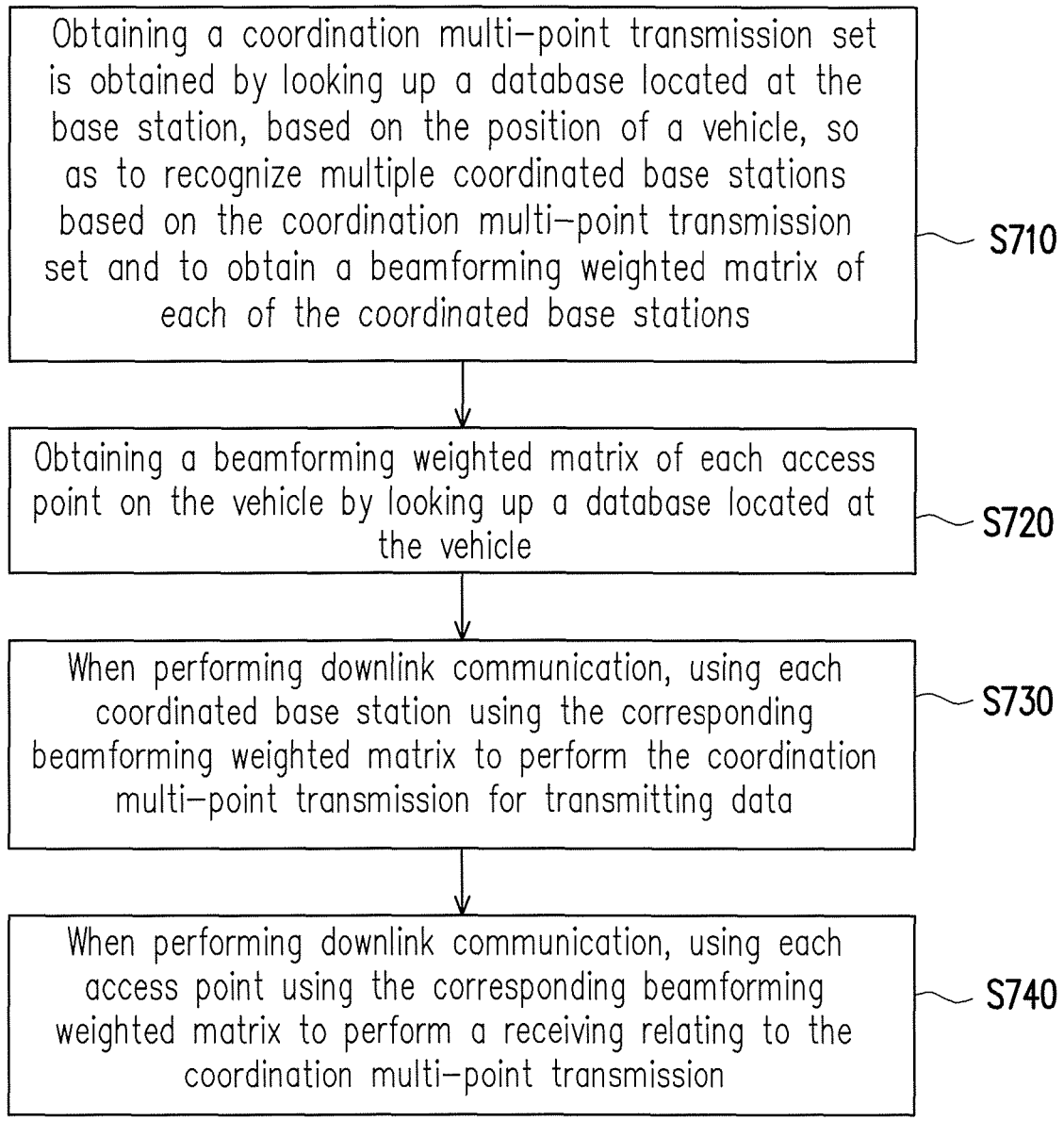
FIG. 7 is a flowchart illustrating that the downlink communication performing between the base station and the access point of the vehicle, according to an exemplary embodiment of the disclosure.

FIG. 7 is a flowchart illustrating for performing downlink communication between the base station and the access point of the vehicle, according to an exemplary embodiment of the disclosure. In step S710, a coordination multi-point transmission set is obtained by looking up the database located at the base station, based on the position of the vehicle, multiple coordinated base stations are recognized based on the coordination multi-point transmission set and a beamforming weighted matrix of each of the coordinated base stations is obtained. In step S720, a beamforming weighted matrix of each access point on the vehicle is obtained by looking up the database located at the vehicle. In step S730, when downlink communication is executed, each coordinated base station uses the corresponding beamforming weighted matrix to perform the coordination multi-point transmission for transmitting data. In step S740, when the downlink communication is executed, each access point uses the corresponding beamforming weighted matrix to perform a receiving relating to the coordination multi-point transmission.

Figure 8:
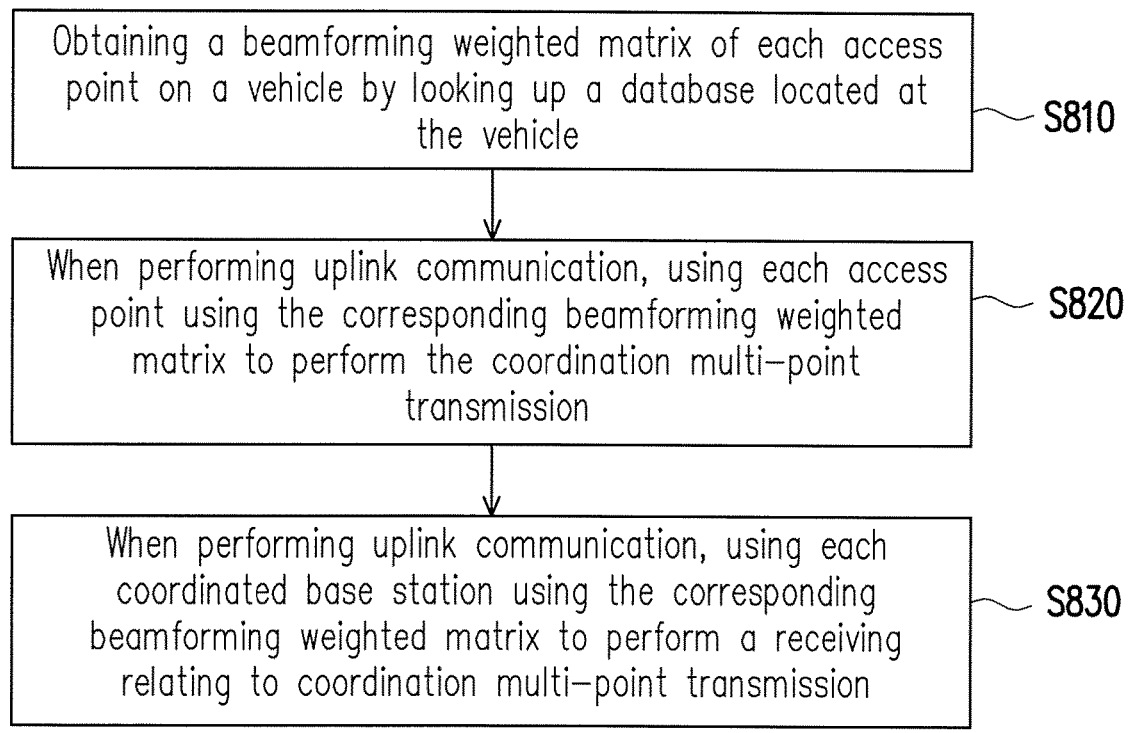
FIG. 8 is a flowchart illustrating performing uplink communication between the base station and the access point of the vehicle, according to an exemplary embodiment of the disclosure.

FIG. 8 is a flowchart illustrating for performing down link communication between the base station and the access point of the vehicle, according to an exemplary embodiment of the disclosure. In step S810, a beamforming weighted matrix of each access point on the vehicle is obtained by looking up the database located at the vehicle. In step S820, when uplink communication is executed, each access point uses the corresponding beamforming weighted matrix to perform the coordination multi-point transmission. Because the beamforming weighted matrix used by each access point is generated based on the position of the coordinated base station, each access point would generate a beam directed to the coordinated base station. As a result, in step S830, when executing the uplink communication, each coordinated base station uses the corresponding beamforming weighted matrix to perform a receiving that relating to coordination multi-point transmission.

As the foregoing descriptions for an exemplary embodiment in the disclosure, to the vehicle moving along the route, the access point on the vehicle and the base stations may obtain the coordination multi-point transmission set by looking up the database. Thus, the base stations do not need to perform the conventional handover procedure for determination whether to serve the access point on the vehicle or not. The frequency of executing the handover procedure may be greatly reduced and the time used in the conventional handover procedure may be reduced. In addition, by the implementation of beamforming and coordination multi-point transmission, the communication quality worsen by the Doppler Effect may be effectively solved. Further, by the coordination between the base stations, the disclosure may improve the reliability of the wireless communication performed by a user's equipment on the moving vehicle.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method of coordination multi-point transmission, suitable for performing communication between at least one access point on a vehicle and a plurality of base stations, the method comprising:
    obtaining a first coordination multi-point set corresponding to a first position of the vehicle by looking up a database according to the first position, wherein the first coordination multi-point set is a set of a plurality of first coordinated base stations among the plurality of base stations; and
    obtaining a first beamforming weighted matrix correspondingly using by each of the first coordinated base stations by looking up the database,
    wherein each of the first coordinated base stations performs a coordination multi-point transmission with the at least one access point on the vehicle by using the corresponding first beamforming weighted matrix of the each of the first coordinated base stations.

2. The method of coordination multi-point transmission according to claim 1, wherein the vehicle moves along a route, the database records a plurality of predetermined positions of the route and a plurality of predetermined coordination multi-point sets respectively corresponding to the predetermined positions,
    wherein the first position is located within a range of one of the predetermined positions and the first coordination multi-point set is one of the predetermined coordination multi-point sets.

3. The method of coordination multi-point transmission according to claim 2, further comprising:
    building up the database which records the predetermined positions and the predetermined coordination multi-point sets based on a service range of the plurality of base stations and the route having the predetermined positions.

4. The method of coordination multi-point transmission according to claim 2, wherein the first position is located within a service range of the each of the first coordinated base stations.

5. The method of coordination multi-point transmission according to claim 2, wherein the database comprises a plurality of distributed databases respectively corresponding to the plurality of base stations, wherein one of the distributed databases corresponding to one of the first coordinated base stations records the first beamforming weighted matrix used by the one of the first coordinated base stations at the first position.

6. The method of coordination multi-point transmission according to claim 1, further comprising:
    when the vehicle moves from the first position to a second position, obtaining a second coordination multi-point set corresponding to the second position by looking up the database according to the second position, wherein the second coordination multi-point set is a set of a plurality of second coordinated base stations among the plurality of base stations, the first coordination multi-point set is different from the second coordination multi-point set, and a portion of the second coordinated base stations is the same as a portion of the first coordinated base stations.

7. The method of coordination multi-point transmission according to claim 6, further comprising:
    instructing the second coordinated base stations to perform the coordination multi-point transmission with the at least one access point on the vehicle according to a plurality of base station identifiers of the second coordination multi-point set recorded in the database, such that the second coordinated base stations determines whether or not to serve the at least one access point of the vehicle without executing a handover procedure.

8. The method of coordination multi-point transmission according to claim 1, further comprising:
    when the vehicle moves from the first position to a second position, reserving a portion of the first coordinated base stations and adding at least one newly-added base station among the plurality of base stations to the first coordination multi-point set, to update the first coordination multi-point set and then obtain a second coordination multi-point set, wherein the second coordination multi-point set is a set of a plurality of second coordinated base stations among the plurality of base stations, and the second coordinated base stations comprise the at least one newly-added base station and the portion of the first coordinated base stations.

9. The method of coordination multi-point transmission according to claim 8, further comprising:
    instructing the second coordinated base stations to perform the coordination multi-point transmission with the at least one access point of the vehicle according to a plurality of base station identifiers of the second coordination multi-point set, such that the second coordinated base stations determine whether or not to serve the at least one access point of the vehicle without executing a handover procedure.

10. The method of coordination multi-point transmission according to claim 1, further comprising:
    obtaining feedback information relating to the first position; and
    using the feedback information to update the first beamforming weighted matrix used by one of the first coordinated base stations, so as to perform the coordination multi-point transmission with the at least one access point by using the updated first beamforming weighted matrix.

11. The method of coordination multi-point transmission according to claim 10, wherein the step of using the feedback information to update the first beamforming weighted matrix used by one of the first coordinated base stations further comprises:
    estimating a measured beamforming weighted matrix of the one of the first coordinated base stations according to the feedback information, and using the measured beamforming weighted matrix to update the first beamforming weighted matrix used by one of the first coordinated base stations.

12. The method of coordination multi-point transmission according to claim 11, wherein the step of using the measured beamforming weighted matrix to update the first beamforming weighted matrix used by the one of the first coordinated base stations further comprises:
executing an interpolation operation between the measured beamforming weighted matrix and the first beamforming weighted matrix used by the one of the first coordinated base stations to obtain the updated first beamforming weighted matrix.

13. The method of coordination multi-point transmission according to claim 10, wherein the feedback information comprises an environmental parameter around the vehicle, a channel feedback information as obtained by executing the coordination multi-point transmission, a current position of the vehicle as measured, or a combination of at least two thereof.

14. The method of coordination multi-point transmission according to claim 1, wherein when the number of the at least one access point is greater than 1, the method further comprises:
determining a second beamforming weighted matrix used by each of the access points according to the first position; and
using the second beamforming weighted matrix used by the each of the access points to perform the coordination multi-point transmission with the first coordinated base stations.

15. A control node, suitable for controlling a plurality of base stations performing communication with at least one access point on a vehicle, the control node comprising:
a connection interface, operably connected to the plurality of base stations; and
a processing circuit, operably coupled to the connection interface and configured for executing:
obtaining a first coordination multi-point set corresponding to a first position of the vehicle by looking up a database according to the first position wherein the first coordination multi-point set is a set of a plurality of first coordinated base stations among the plurality of base stations; and
obtaining a first beamforming weighted matrix correspondingly used by each of the first coordinated base stations by looking up the database,
wherein each of the first coordinated base stations performs a coordination multi-point transmission with the at least one access point on the vehicle by using the corresponding first beamforming weighted matrix of the each of the first coordinated base stations.

16. The control node according to claim 15, wherein the vehicle moves along a route, the database records a plurality of predetermined positions of the route and a plurality of predetermined coordination multi-point sets respectively corresponding to the predetermined positions,
wherein the first position is located within a range of one of the predetermined positions and the first coordination multi-point set is one of the predetermined coordination multi-point sets.

17. The control node according to claim 16, wherein the processing circuit is configured to execute:
building up the database which records the predetermined positions and the predetermined coordination multi-point sets based on a service range of the plurality of base stations and the route having the predetermined positions.

18. The control node according to claim 16, wherein the first position is located within a service range of each of the first coordinated base stations.

19. The control node according to claim 16, wherein the database comprises a plurality of distributed databases respectively corresponding to the plurality of base stations, wherein one of the distributed databases corresponding to one of the first coordinated base stations records the first beamforming weighted matrix used by the one of the first coordinated base stations at the first position.

20. The control node according to claim 15, wherein the processing circuit is configured to execute:
when the vehicle moves from the first position to a second position, obtaining a second coordination multi-point set corresponding to the second position by looking up the database according to the second position, wherein the second coordination multi-point set is a set of a plurality of second coordinated base stations among the plurality of base stations, the first coordination multi-point set is different from the second coordination multi-point set, and a portion of the second coordinated base stations is the same as a portion of the first coordinated base stations.

21. The control node according to claim 20, wherein the processing circuit is configured to execute:
instructing the second coordinated base stations to perform the coordination multi-point transmission with the at least one access point on the vehicle according to a plurality of base station identifiers of the second coordination multi-point set recorded in the database, wherein the second coordinated base stations determines whether or not to serve the at least one access point of the vehicle without executing a handover procedure.

22. The control node according to claim 15, wherein the processing circuit is configured to execute:
when the vehicle moves from the first position to a second position, reserving a portion of the first coordinated base stations and adding at least one newly-added base station among the plurality of base stations to the first coordination multi-point set, to update the first coordination multi-point set and then obtain a second coordination multi-point set, wherein the second coordination multi-point set is a set of a plurality of second coordinated base stations among the plurality of base stations, and the second coordinated base stations comprise the at least one newly-added base station and the portion of the first coordinated base stations.

23. The control node according to claim 22, wherein the processing circuit is configured to execute:
instructing the second coordinated base stations to perform the coordination multi-point transmission with the at least one access point of the vehicle according to a plurality of base station identifiers of the second coordination multi-point set, such that the second coordinated base stations determine whether or not to serve the at least one access point of the vehicle without executing a handover procedure.

24. The control node according to claim 15, wherein the processing circuit is configured to execute:
obtaining feedback information relating to the first position; and
using the feedback information to update the first beamforming weighted matrix used by one of the first coordinated base stations, so as to perform the coordination multi-point transmission with the at least one access point by using the updated first beamforming weighted matrix.

25. The control node according to claim 24, wherein the processing circuit is configured to execute:
   estimating a measured beamforming weighted matrix of the one of the first coordinated base stations according to the feedback information, and using the measured beamforming weighted matrix to update the first beamforming weighted matrix used by one of the first coordinated base stations.

26. The control node according to claim 25, wherein the processing circuit is configured to execute:
   performing an interpolation operation between the measured beamforming weighted matrix and the first beamforming weighted matrix used by the one of the first coordinated base stations to obtain the updated first beamforming weighted matrix.

27. The control node according to claim 24, wherein the feedback information comprises an environmental parameter around the vehicle, a channel feedback information as obtained by executing the coordination multi-point transmission, a current position of the vehicle as measured, or a combination of at least two thereof.

28. A wireless communication device, configured in a vehicle and suitable for communicating with a plurality of base stations, the wireless communication device comprising:
   a plurality of access points, connected to each other, wherein each of the access points respectively comprising at least one antenna; and
   a controller, operably connected to the access points and configured to execute:
   obtaining a first coordination multi-point set corresponding to a first position of the vehicle by looking up a database according to the first position and obtaining a second beamforming weighted matrix correspondingly used by each of the access points, wherein the first coordination multi-point set is a set of a plurality of first coordinated base stations among the plurality of base stations; and
   performing a coordination multi-point transmission with the first coordinated base stations by using the second beamforming weighted matrix correspondingly used by each of the access points.

29. The wireless communication device according to claim 28, wherein the vehicle moves along a route, the database records a plurality of predetermined positions of the route and a plurality of predetermined coordination multi-point sets respectively corresponding to the predetermined positions,
   wherein the first position is located within a range of one of the predetermined positions and the first coordination multi-point set is one of the predetermined coordination multi-point sets.

30. The wireless communication device according to claim 29, the first position is located within a service range of each of the first coordinated base stations.

31. The wireless communication device according to claim 28, wherein the controller is configured to execute:
   when the vehicle moves from the first position to a second position, obtaining a second coordination multi-point set corresponding to the second position by looking up the database according to the second position, wherein the second coordination multi-point set is a set of a plurality of second coordinated base stations among the plurality of base stations, the first coordination multi-point set is different from the second coordination multi-point set, and a portion of the second coordinated base stations is the same as a portion of the first coordinated base stations.

32. The wireless communication device according to claim 31, wherein the controller is configured to execute:
   when the vehicle moves from the first position to a second position, switching from communicating with the first coordinated base stations to communicating with the second coordinated base stations without executing a handover procedure.

* * * * *